Patented Oct. 21, 1952

2,615,051

UNITED STATES PATENT OFFICE 2,615,051

ETHERIFICATION OF HYDROQUINONE

Henry W. Grote, Hinsdale, Ill., assignor to Universal Oil Products Company, Chicago, Ill., a corporation of Delaware No Drawing. Application June 10, 1950, Serial No. 167,480

8 Claims. (Cl. 260—613)

The present invention relates to the conversion of hydroquinone and more particularly to a novel method for obtaining improved results in this process.

In the reaction of hydroquinone with an etherification reagent, for example, it is desired to handle the hydroquinone as a liquid for ease in pumping and thereby permit the use of a continuous flow process for effecting this reaction. However, it has been found that when hydroquinone is heated to a temperature above its melting point (339° F.) the hydroquinone undergoes decomposition with the resultant formation of tar and other undesirable products. When the hydroquinone and its decomposition products are used in the etherification process, the yield of desired ethers is reduced and difficulties are encountered in effecting the reaction.

I have now found that the hydroquinone may be dissolved in water and the resultant solution utilized as charge to the etherification process. This permits an easy and ready method of pumping the hydroquinone from storage tanks to the reaction zone and thus permits its use in a continuous flow operation. This results in the presence of additional water in the reaction zone but, by suitably modifying the operating conditions, I have found that the presence of the additional water may be tolerated.

The etherification of hydroquinone using such reagents as alcohols and/or dialkyl ethers is a dehydration reaction and results in the formation of water as a by-product of the process. In the past, research has been directed primarily to methods and means of minimizing the amount of water present in the reaction zone because it has been found that the presence of water reduces the extent of conversion. However, as hereinbefore set forth, it has been found that the presence of water may be tolerated by suitable modification of the process conditions in the manner to be hereinafter set forth in detail.

In one embodiment the present invention relates to an etherification process which comprises dissolving hydroquinone in water and reacting said hydroquinone in the presence of said water with a reagent selected from an alcohol and a dialkyl ether at a temperature of from about 450° to about 700° F.

In a specific embodiment the present invention relates to a process for the manufacture of p-methoxyphenol which comprises dissolving hydroquinone in water and reacting said hydroquinone in the presence of said water with dimethyl ether at a temperature of from about 450° to about 700° F.

The present invention may be utilized for the manufacture of a p-alkoxyphenol. When p-methoxyphenol is desired, hydroquinone is reacted with methyl alcohol and/or dimethyl ether. When other alkoxyphenols are desired, the corresponding alcohol and/or dialkyl ether is employed. Other alcohols include ethanol, propanol, butanol, pentanol, etc. Other dialkyl ethers include diethyl ether, dipropyl ether, dibutyl ether, diamyl ether, etc. and, where mixed alkoxyphenols are desired, dialkyl ethers having different alkyl groups may be employed such as methyl ethyl ether, methyl propyl ether, methyl butyl ether, methyl amyl ether, ethyl propyl ether, ethyl butyl ether, ethyl amyl ether, propyl butyl ether, propyl amyl ether, butyl amyl ether, etc.

The reaction is effected in the presence of any suitable catalyst, a particularly preferred catalyst comprising a composite or association of silica and alumina, prepared either synthetically or naturally occurring. Of the naturally occurring catalysts, acid treated clays such as Filtrol, Tonsil, etc. are preferred. Other catalysts comprise solid dehydrating catalysts including the oxides of aluminum, thorium, tungsten, titanium, zirconium, molybdenum, chromium, etc., either alone or together with the oxides of aluminum, magnesium and zinc, potassium carbonate, etc. It is understood that these catalysts are not necessarily equivalent in their activity but that all of them are effective to catalyze the reaction.

The temperature to be employed is within the range of from about 450° to about 700° F. The pressure may range from atmospheric to 1000 pounds, or more, per square inch. In general it is preferred to utilize a stoichiometric excess of alcohol or dialkyl ether which, with the alcohol may range from 1 to 20 mols or more per mol of hydroquinone and with dialkyl ether may range from about 0.5 mol to 10 mols or more per mol of hydroquinone.

The amount of water to be used in dissolving the hydroquinone may range from about 0.1 to 1 part water per 1 part hydroquinone. In general, it is desired to utilize a small amount of water but preferably at least 1 part of water is used per 4 parts of hydroquinone in order that the resultant mixture will be liquid at a temperature not greater than about 250° F. As hereinbefore set forth, heating the hydroquinone to a temperature above about 339° F. results in decomposition thereof.

In the operation of the process, the alcohol and/or dialkyl ether may be separately heated and then commingled with the hydroquinone. The aqueous hydroquinone solution may be separately heated to a temperature below that at which decomposition occurs and then commingled with the alcohol and/or dialkyl ether. In another embodiment, the alcohol and/or dimethyl ether and hydroquinone solution may be heated in commingled state. It has been found that the hydroquinone does not undergo substantial decomposition when in the presence of the reaction mixture and catalyst. In another embodiment of the invention, the reagents, either at room temperature or after partial heating may be introduced into the reaction zone to which heat is supplied so that the desired temperature is obtained.

A particularly preferred process comprises one in which the catalyst is disposed as a fixed bed in the reaction zone and the reagents are introduced thereto in either upward or downward flow. When desired, the reaction zone may be heated electrically, by heat indirect exchange with a suitable heating medium such as hot fuel gases, Dowtherm which is an eutectic mixture of diphenyl oxide and diphenyl, or in any other suitable manner.

While the fixed bed type of process is generally preferred, other suitable processes include reaction zones containing trays on which the catalyst is disposed and the trays being so positioned that the reactants follow a circuitous route in passing through the reaction zone. Another method of operation may be the fluidized type process in which the catalyst is introduced into the reaction zone by means of all or a portion of the reactants and the flow rate being regulated to maintain the catalyst as a turbulent mass under hindered settling conditions.

While the features of the present invention are particularly applicable to a continuous flow operation, it is understood that these advantages also apply to batch type processes. In either process, the products from the reaction zone are separated to recover excess alcohol and/or dialkyl ether, water, by-products such as hydroxyanisole and dialkoxybenzene, the desired p-alkoxyphenol, and unconverted hydroquinone. This separation may be effected in any suitable manner including solvent extraction, fractionation, steam stripping, etc.

In a preferred method of operation the hydroquinone and higher boiling material are separated from the other effluent products. The hydroquinone and higher boiling residue are subjected to steam stripping to strip hydroquinone overhead, the resultant hydroquinone-aqueous fraction being recycled to the reaction zone for further conversion therein. In one method, the hydroquinone-aqueous fraction may be condensed to form a liquid stream for recycling and, when desired, fresh hydroquinone charge may be commingled therewith and the resultant stream utilized as charge to the reaction zone.

Excess alcohol and/or dialkyl ether are preferably recycled to the reaction zone for further use in the process. When desired, the dialkoxybenzene similarly may be recycled to the reaction zone as it has been found that dialkoxybenzene will react with hydroquinone to form p-alkoxyphenol. In another embodiment of the invention, the water separated from the effluent products of the process may be utilized to dissolve hydroquinone to prepare the charge to the reaction zone.

From the description hereinbefore set forth, it is apparent that the present invention offers a novel method for obtaining increased efficiency in the etherification of hydroquinone, both as to greater utilization of the hydroquinone, with the concomitant increased yields of desired alkoxyphenol, and also as regards to improved process operation.

It is understood that the novel features of the present invention are also applicable to any process in which hydroquinone is one of the reactants. Hydroquinone is used as source material for the manufacture of other products, in addition to p-alkoxyphenol, including dialkoxybenzenes, amino substituted alkoxybenzenes, etc.

The following example is introduced to illustrate further the novelty and utility of the present invention but not with the intention of unduly limiting the same.

Two parts hydroquinone were dissolved in one part water and the resultant solution maintained at a temperature ranging from 254° to 300° F. No decomposition of hydroquinone was observed. The resultant solution was introduced, together with dimethyl ether, in a ratio ranging from 2 to 3 mols of dimethyl ether per mol of hydroquinone, in a continuous flow operation to a reactor containing synthetic silica-alumina catalyst in the form of spheres of approximately 2 mm. diameter. The reaction zone was maintained at a temperature which ranged from 502° to 605° F. The run was divided into 6 periods for a total on stream time of 154 hours. The pressure ranged from 500 to 515 pounds per square inch, and the hydroquinone was introduced at a rate of 0.12 volumes of hydroquinone (excluding water) per volume of catalyst.

In an operation as described above, the ultimate weight per cent yield of the desired p-methoxyphenol was above 80% and in some of the periods, for example, ranged as high as 88.3%. These high yields of p-methoxyphenol constitute a great improvement and may be attributed to the substantial absence of hydroquinone decomposition products and to the improved operation of the process.

In contrast to the improved results obtained in the above manner, previous runs made in the same plant in which the hydroquinone was heated to provide a molten charge resulted in ultimate yields of the desired p-methoxyphenol of below 70% and in some cases as low as 34.8%. Further, the yields of undesired dimethoxybenzene were considerably greater than obtained when the hydroquinone charge was dissolved in water. Also, as hereinbefore set forth, operation of the process was improved when utilizing the aqueous hydroquinone charge.

I claim as my invention:

1. An etherification process which comprises dissolving from about 1 to about 10 parts hydroquinone in 1 part water at a temperature below the decomposition temperature of hydroquinone, introducing the resultant solution to a reaction zone and therein reacting said hydroquinone in the presence of said water with a reagent selected from the group consisting of an alcohol and a dialkyl ether at a temperature of from about 450° to about 700° F. and a pressure of from about atmospheric to about 1000 pounds per square inch.

2. The process of claim 1 further characterized in that the effluent products of the reaction are separated into a hydroquinone-containing residue, the hydroquinone stripped therefrom by means of steam, and the resultant aqueous hydroquinone fraction being recycled to the process for further conversion therein.

3. The process of claim 1 further characterized in that said hydroquinone and said reagent are reacted in the presence of a silica-alumina catalyst.

4. A process for the etherification of hydroquinone which comprises commingling with the hydroquinone a sufficient quantity of water to dissolve the same and dissolving the hydroquinone in the water at a temperature below the decomposition temperature of hydroquinone, introducing the resultant solution into a reaction zone and therein reacting the hydroquinone at a temperature of from about 450° to about 700° F. with an etherifying agent selected from the group consisting of an alcohol and a dialkyl ether.

5. A process for the etherification of hydroquinone which comprises commingling with the hydroquinone a sufficient quantity of water to dissolve the same and dissolving the hydroquinone in the water at a temperature below the decomposition temperature of hydroquinone, introducing the resultant solution into a reaction zone and therein reacting the hydroquinone at a temperature of from about 450° to about 700° F. with a dialkyl ether.

6. A process for the etherification of hydroquinone which comprises commingling with the hydroquinone a sufficient quantity of water to dissolve the same and dissolving the hydroquinone in the water at a temperature below the decomposition temperature of hydroquinone, introducing the resultant solution into a reaction zone and therein reacting the hydroquinone at a temperature of from about 450° to about 700° F. with dimethyl ether.

7. A process for the etherification of hydroquinone which comprises commingling with the hydroquinone a sufficient quantity of water to dissolve the same and dissolving the hydroquinone in the water at a temperature below the decomposition temperature of hydroquinone, introducing the resultant solution into a reaction zone and therein reacting the hydroquinone at a temperature of from about 450° to about 700° F. with an alcohol.

8. The process of claim 7 further characterized in that said alcohol is methanol.

HENRY W. GROTE.

REFERENCES CITED

The following references are of record in the file of this patent:

UNITED STATES PATENTS

| Number | Name | Date |
|---|---|---|
| 1,705,494 | Novotny et al. | Mar. 19, 1929 |
| 1,883,952 | Klarmann et al. | Oct. 25, 1932 |
| 1,966,635 | Marx et al. | July 17, 1934 |
| 2,280,814 | Fernholz | Apr. 28, 1942 |